United States Patent
Wilson, Jr.

(10) Patent No.: US 7,210,899 B2
(45) Date of Patent: May 1, 2007

(54) PASSIVE CLEARANCE CONTROL

(76) Inventor: Jack W. Wilson, Jr., 15551 79th Ter., Palm Beach Gardens, FL (US) 33418

( * ) Notice: Subject to any disclaimer, the term of this patent is extended or adjusted under 35 U.S.C. 154(b) by 165 days.

(21) Appl. No.: 11/101,705

(22) Filed: Apr. 8, 2005

(65) Prior Publication Data

US 2005/0265827 A1    Dec. 1, 2005

Related U.S. Application Data

(63) Continuation of application No. 10/653,574, filed on Sep. 2, 2003, now Pat. No. 6,877,952.

(60) Provisional application No. 60/409,136, filed on Sep. 9, 2002, now abandoned.

(51) Int. Cl.
*F01D 11/08*    (2006.01)

(52) U.S. Cl. ............... 415/173.1; 415/136; 415/173.3

(58) Field of Classification Search .................. 415/1, 415/126, 128, 136, 138, 173.1, 173.3, 173.5, 415/174.1
See application file for complete search history.

(56) References Cited

U.S. PATENT DOCUMENTS

| | | | |
|---|---|---|---|
| 3,085,398 A | 4/1963 | Ingleson | |
| 3,141,651 A | 7/1964 | Moyer | |
| 3,146,992 A | 9/1964 | Farrell | |
| 3,391,904 A | 7/1968 | Albert et al. | |
| 3,807,891 A | 4/1974 | McDow et al. | |
| 3,966,354 A | 6/1976 | Patterson | |
| 4,069,662 A | 1/1978 | Redinger, Jr. et al. | |
| 4,127,357 A | 11/1978 | Patterson | |
| 4,247,248 A | 1/1981 | Chaplin et al. | |
| 4,251,185 A | 2/1981 | Karstensen | |
| 4,330,234 A | 5/1982 | Colley | |
| 4,363,599 A | 12/1982 | Cline et al. | |
| 4,565,492 A * | 1/1986 | Bart et al. | 415/175 |
| 4,642,024 A | 2/1987 | Weidner | |
| 4,679,981 A | 7/1987 | Guibert et al. | |
| 5,080,557 A | 1/1992 | Berger | |
| 5,092,737 A | 3/1992 | Lau | |
| 5,116,199 A | 5/1992 | Ciokajlo | |
| 5,228,828 A | 7/1993 | Damlis et al. | |
| 5,282,721 A | 2/1994 | Kildea | |
| 5,314,303 A | 5/1994 | Charbonnel et al. | |
| 5,330,321 A | 7/1994 | Roberts et al. | |
| 5,553,449 A | 9/1996 | Rodgers et al. | |
| 5,593,277 A | 1/1997 | Proctor et al. | |
| 5,601,402 A | 2/1997 | Wakeman et al. | |
| 5,639,210 A | 6/1997 | Carpenter et al. | |
| 5,871,333 A | 2/1999 | Halsey | |
| 6,382,905 B1 | 5/2002 | Czachor et al. | |
| 6,406,256 B1 | 6/2002 | Marx | |
| 6,896,484 B2 * | 5/2005 | Diakunchak | 415/173.1 |

* cited by examiner

*Primary Examiner*—Thomas Denion
*Assistant Examiner*—Dwayne J White

(57) ABSTRACT

The clearance between the tips of the rotor blades and the segmented shroud of a gas turbine engine is controlled by a passive clearance control that includes a support ring made from a low thermal expansion material supporting a retainer for the blade outer air seal that is slidable relative thereto so that the segments expand circumferentially and move radially to match the rate of change slope of the rotor during expansion and contraction for all engine operations. A leaf spring between the support ring and outer air seal biases the outer air seal in the radial direction and maintains the desired radial position during steady state operation of the gas turbine engine.

18 Claims, 3 Drawing Sheets

PASSIVE CLEARANCE CONTROL

CROSS-REFERENCE TO RELATED APPLICATIONS

This application claims benefit of a prior filed U.S. regular application Ser. No. 10/653,574, filed on Sep. 2, 2003, now U.S. Pat. No. 6,877,952, issued on Apr. 12, 2005, and a prior filed U.S. provisional application Ser. No. 60/409,136, filed on Sep. 9, 2002 now abandoned.

STATEMENT REGARDING FEDERALLY SPONSORED RESEARCH OR DEVELOPMENT

None.

BACKGROUND OF THE INVENTION

1. Field of the Invention

This invention relates to gas turbine engines and more particularly to the rotors and surrounding shrouds and means for reducing the clearance between the tips of the blades of the rotors and the shrouds and more particularly to a passive means of controlling this clearance.

2. Description of the Related Art including information disclosed under 37 CFR 1.97 and 1.98

As one skilled in the gas turbine engine technology knows, there has been and continues to be a desire to reduce the clearance between the tips of the blades of the engine's rotors and the surrounding shrouds, sometimes referred to as blade outer air seal (BOAS) or blade segments, so as to improve the operating efficiency of the engine. Scientists and engineers have developed a number of systems for reducing the clearance with the aim of making it as tight as possible and a continuing effort is currently being made to make these clearances even tighter without adversely affecting the structural integrity of the component parts. Generically speaking, there are two types of systems that have played a prominent role in this area of technology, namely, the active clearance control and the passive clearance control.

The active clearance control typically requires a valve, plumbing, a control and actuator for positioning the valve at given times during the operating envelope of the engine. In particular, where cool air is utilized as the medium for cooling the components, cool air is circulated in the vicinity of the operating parts, which is generally during the cruise condition of the aircraft being powered by the engine. The clearance between the rotor and tips of the blade is designed so that the tips of the blades do not rub up against the blade segments during the high powered operation of the engine, such as, during take-off when the blade disc and blades expand as a result of the high temperature and centrifugal loads. As soon as the engine power is lowered to the cruise condition, and the component parts contract, the active clearance control is actuated to deliver cooler air to the adjacent components to reduce the heat load of the case or adjacent components. The result is to shrink the case and those adjacent component and position them closer to the tips of the blades so as to minimize the leakage of engine working medium between the tips of the blades of the rotor and the blade segments. Obviously, the leakage represents loss of energy that has been added to the engine working medium and represents a deficit in engine efficiency. Of course, the down side of the active clearance control is that it adds complexity to engine, requires valving and moving parts, a control system and in many installations it requires piping that surrounds the engine case to shower the case with cooling air to effectuate the contraction thereof.

An example of an active clearance control is described in U.S. Pat. No. 4,069,662 granted on Jan. 24, 1978 to Redinger, Jr. et al and entitled CLEARANCE CONTROL FOR A GAS TURBINE ENGINE. As noted above, this control impinges cool air from pipes surrounding the engine case onto the engine case to cause the case to shrink and position the blade segments closer to the tips of the turbine blades in order to reduce clearance during the cruise operation of the aircraft.

The passive clearance control also serves to maintain low clearance between the tips of the blades of the rotor and the blade segments and performs this function without the use of valves, controls and typically without extra piping. For example, when applied to internally cooled turbine blades, the spent cooling air discharging from the turbine is oriented toward the pressure side of the turbine blade and adjacent to the tip of the turbine blade in order to define a fluid dam in the gap so as to seal off the gap entrance and hence, reduce the leakage of the engine working medium. Such a system is described in U.S. Pat. No. 5,282,721 granted on Feb. 1, 1994 to Robert J. Kildea and entitled PASSIVE CLEARANCE SYSTEM FOR TURBINE BLADES.

Other attempts to reduce clearances include the use materials that exhibit the desired coefficient of expansion and/or heat transfer coefficients.

One of the major obstacles that the designer needs to overcome is the selection of a system that will contemplate the relatively faster expansion/contraction of the lower mass blades and the slower expansion/contraction of the disc supporting the blades. Notwithstanding the advances made in this technology, all of the systems alluded to in the above paragraphs do not achieve a relatively constant clearance during the transient operation of the engine. In other words, since the blades and discs have different coefficients of expansion as do the surrounding shrouds and blade segments, the gap dimensions vary during these transients. Hence, if the gap increased during the transient, there will be an increase in leakage of the engine working medium flowing through this gap.

This invention obviates this problem noted in the immediate above paragraph by providing specific material of the component parts and designing the blade segment assembly so that the blade segments will effectively follow the slope of the growth and the shrinkage of the rotor and blade. Accordingly, the expansion/contraction slope of the blade segments match the expansion/contraction slope of the blades and disc of the rotor for all conditions of the engine's operating envelope. This invention contemplates the use of the low thermal expansion material, such as Nilo-K or Inco 909 for the support ring and it, together with the design of the retainer and its relationship to the blade segments permit the floating of the blade segments which effectuates a match of the slopes of the rotating and non-rotating parts.

BRIEF SUMMARY OF THE INVENTION

An object of this invention is to provide an improved passive clearance control for the blades of rotors of a gas turbine engine.

A feature of this invention is to provide a passive clearance control that is characterized as growing and contracting as a function of the growth and contraction of the rotor so that the growth/shrinkage curves match.

Another feature of this invention is to provide retaining rings that support the support rings of the blade segment assembly with spaces to allow the shroud to move in both a circumferential and radial direction so as to define a floating assembly.

Another feature of this invention is to dispose a spring between the shroud portion of the blade segment assembly to bias the shroud radially inward toward the center line of the engine so as to be urged toward the tips of the blades.

Another feature of this invention is to make the support ring from a low thermal expansion material, either metal, like Nilo K or Inco 909 or a composite material.

This invention is characterized as being relatively simple to manufacture and assemble, easy to maintain, relatively inexpensive and should have a long operating life.

The foregoing and other features of the present invention will become more apparent from the following description and accompanying drawings.

DETAILED DESCRIPTION OF THE INVENTION

While the preferred embodiment of this invention is the turbine blade segment, one skilled in this art will also appreciate the fact that this invention has utility for use in a compressor assembly. In a dual spool gas turbine engine, for example, the blade segment of this invention can be used in the high pressure compressor and/or fan, low pressure compressor, first stage turbine and low stage turbine. In certain applications, the serpentine cooling that will be described herein below can be omitted and any other type of biasing or spring means other than the leaf spring can be utilized to urge the shroud toward the tips of the blades. While the preferred material is a low thermal expansion metal, as one skilled in this art will appreciate, a composite material can be substituted thereof. The major criteria is that the material selected must exhibit a low thermal expansion coefficient and be capable of withstanding the hostile environment encountered in the turbine power plant technology.

Figure 2:
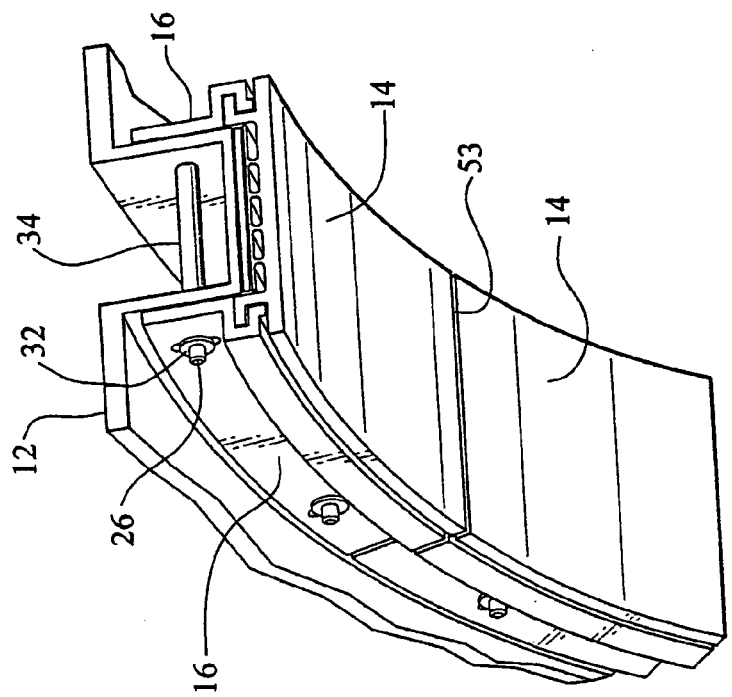
FIG. 2 is a partial view in perspective illustrating the details of this invention.
Figure 1:
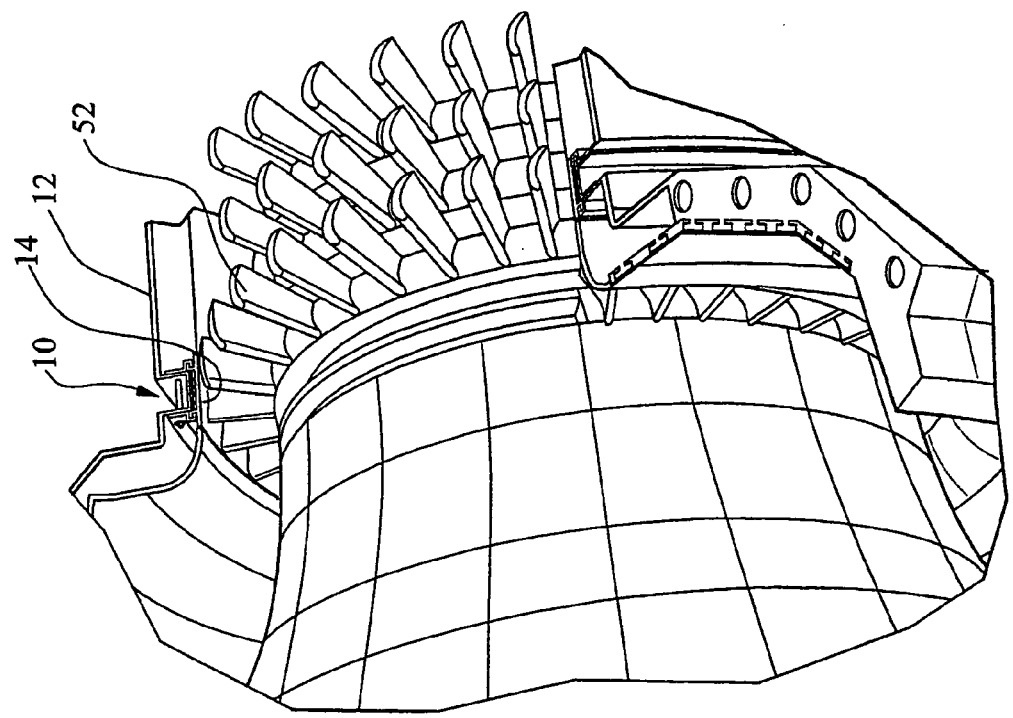
FIG. 1 is a fragmentary perspective view of the turbine section of a gas turbine engine where this invention is being utilized.
Figure 3:
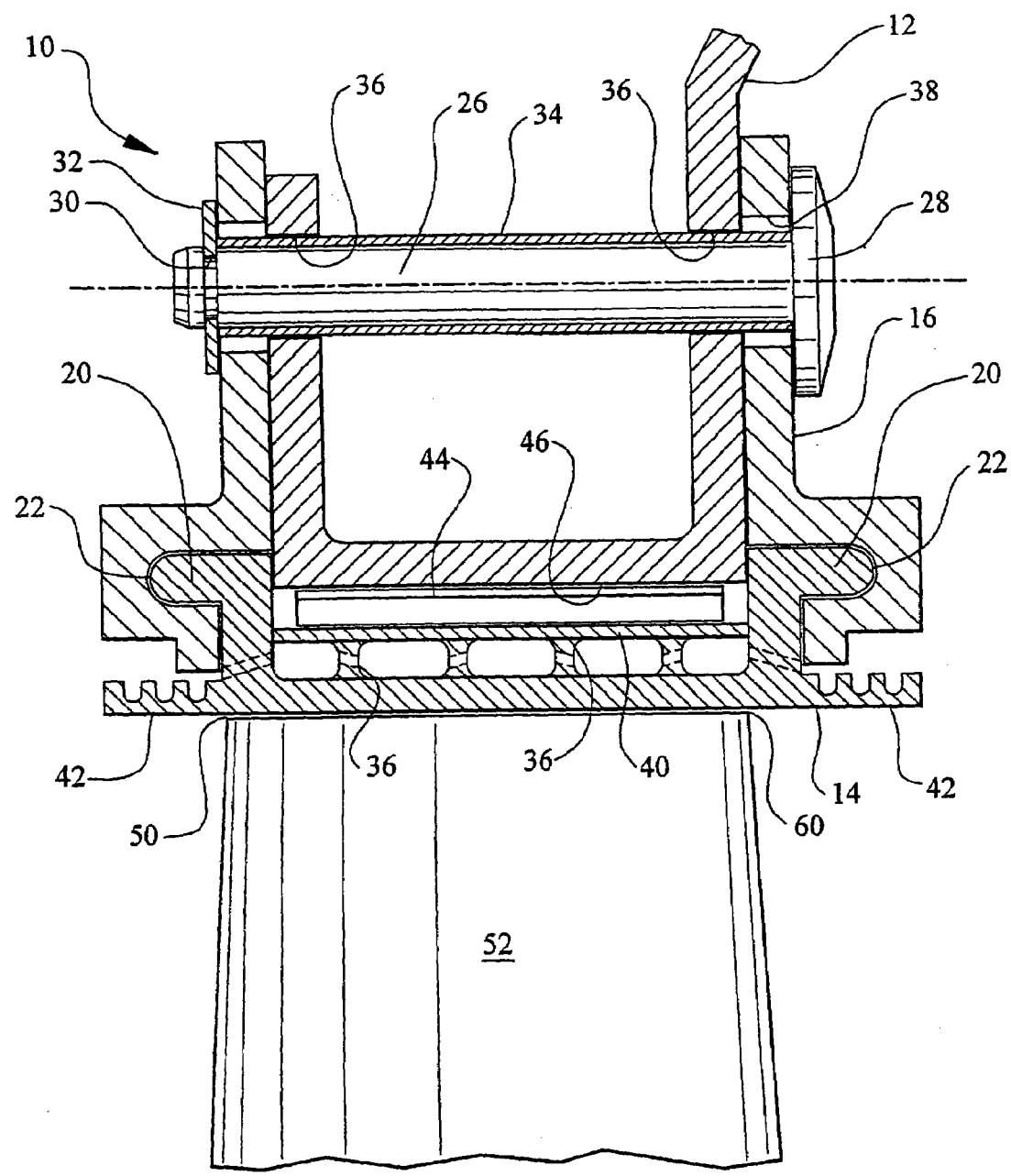
FIG. 3 is a fragmentary enlarged view in section illustrating the details of this invention.

The invention can best be understood by referring to FIGS. 1–3 which illustrate the floating blade segments or BOAS generally indicated by reference numeral 10 comprising a generally U-shaped support ring 12 suitably attached to the engine case (not shown) and made of a low thermal expansion material such as Nilo K or Inco 909 or other metallic or composite material, the shroud or BOAS 14 are affixed to the retainers 16 mounted on either side of the support ring 12. The shroud 14 includes an upstanding support arm 18 formed on either side that includes a jaw 20 that fits into groove 22 formed on the widened portion 24 of the retainers 16. The retainers 16 are attached to the support ring 12 via the tie bolt 26 that includes a head 28 that abuts against the outer face of retainer 12 and extends through drilled holes formed in retainers 16. The opposing end of tie bolt 26 extends to the opposite face of retainer 16 and includes an annular groove 30 to accept a lock ring 32. The tie bolt 26 fits into sleeve 34 that also extends through the drilled holes formed in the retainers 16 and sleeve 34 fits snugly into drilled holes 36 formed in the support ring 12. A suitable material for the sleeve 34 and tie bolt 26 can be Stellite 31. Slot 38 is formed in the retainers 16 adjacent the sleeve 34 so that the retainers can move radially with respect to the engine's center line (not shown) as will be described in greater detail herein below. The BOAS 14 includes a plurality of upstanding axially spaced serpentine ribs 36 mounted between the top face 40 of the BOAS 14 and cooling air typically from the engine's compressor discharge (not shown) is fed to the ribs 36 that leak via the labyrinth seal 42 formed on opposite ends of the BOAS 14. Leaf spring 44 is mounted between the bottom end 46 of the U-shaped support ring 12 that biases the BOAS 14 toward the tip 50 of the blade 52. While other springs, other than leaf springs can be utilized for this purpose, a suitable leaf spring is Haynes 88.

As is apparent from the foregoing, as the blade and its disc expands when the engine begins its operating cycle, the tip 50 tends to migrate toward the bottom face of the BOAS 14. Obviously, the BOAS needs to move to avoid rubbing against the tip of the blade. In accordance with this invention, the BOAS 14 are formed in segments that define the shroud surrounding the tips of the blades 52 and each segment is circumferentially spaced from the adjacent segment as depicted by gap 53. As these components heat up and expand, the expansion is in a circumferential direction and the segments grow toward each other. Also according to this invention, since the BOAS 14 is attached to the retainer 16, the retainer 16 can move radially upwardly within the slots 38. This movement tracks the movement of the growth of the disc and blades of the rotor and holds the gap 60 relatively constant and as close to each other as possible. This holds the leakage to a minimum and obviously improves the operating efficiency of the engine. In the expansion mode, it is apparent, that the adjacent segments of the blade outer air seals abut each other and in a sense lock up. The slot 38 in the retainers 16 allow the segments to move radially, thus achieving a rate of change movement that matches the rate of change movement of the rotor and blades. This behavior represents the take-off mode of the aircraft. After take-off the aircraft goes into cruise mode and the engine power is reduced. During this operation the rotor and BOAS contracts and follows the same rate of change as was described with the take-off mode. The leaf spring 44 at this juncture holds the BOAS in the desired radial position.

Figure 4:
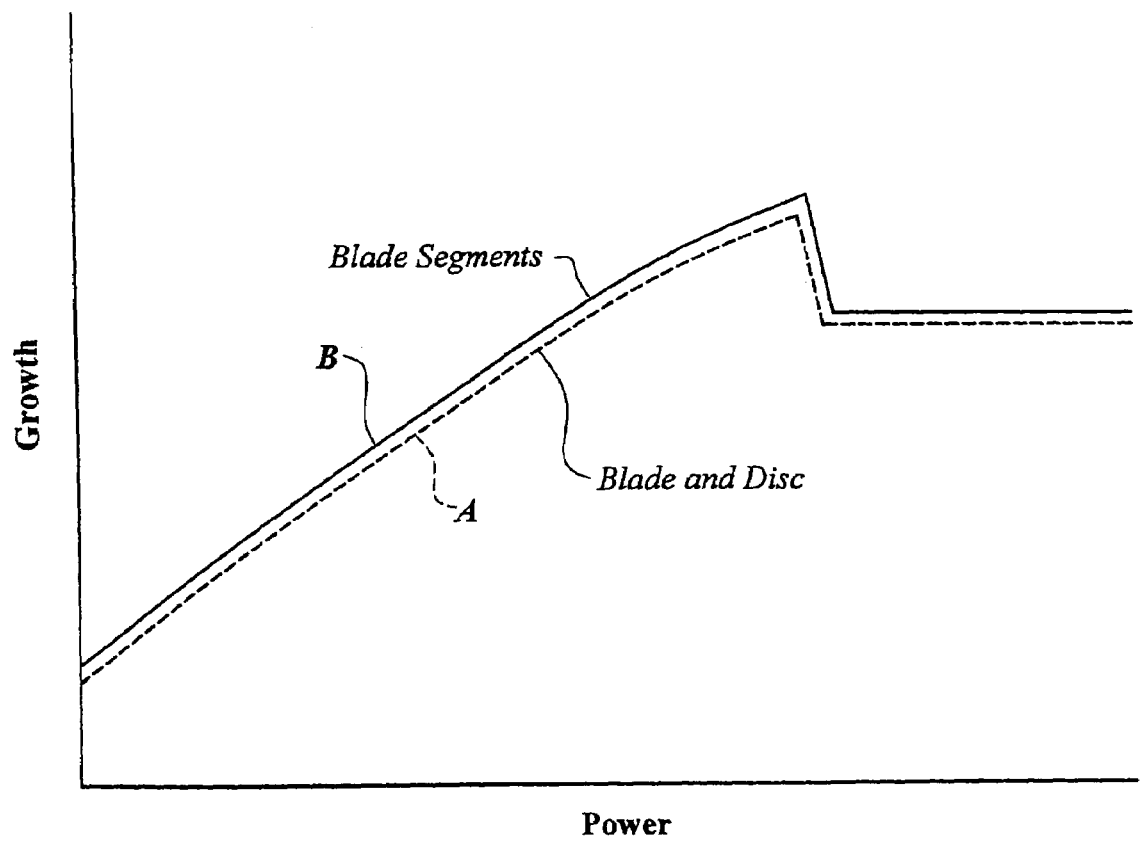
FIG. 4 is a graphical illustration mapping the growth and shrink rate of the rotor and the blade segment.

As best seen in FIG. 4 as the engine increases its power, as for take-off of the aircraft, and reaches the cruise altitude, the power of the engine is receded to operate at the cruise mode and the temperature of the component parts begin to cool and hence, the contraction thereof will occur. As was described with the expansion process, the contraction process is almost identical. As shown in the graph of FIG. 4, the growth v. time or power illustrates the curve of the rotating components depicted by letter A and the curve of the non-rotating components, namely the BOAS 14, depicted by letter B. As noted therein, the curve B matches the slope of curve A maintaining a constant gap 60.

What has been shown by this invention is a passive clearance control requiring no valves, conduits, controls and the like for maintaining a small gap between the tips of the blades and the BOAS. This design can be implemented for both the turbine and compressor rotors. In contrast to the active clearance control, this passive clearance control allows the BOAS and its retainer to move radially relative to its support ring so that the BOAS can expand in both the circumferential and radial directions and it is characterized as being relatively simple, requires no additional complex components and is relatively maintenance free.

Although this invention has been shown and described with respect to detailed embodiments thereof, it will be appreciated and understood by those skilled in the art that various changes in form and detail thereof may be made without departing from the spirit and scope of the claimed invention.

I claim the following:

1. A process of passively controlling a blade gap between a tip shroud and a rotor blade in a gas turbine engine, the gas turbine engine comprising a support ring secured to an engine casing, a plurality of retainer and shroud assemblies secured to the support ring and forming a segment gap between adjacent shroud segments, and a rotor blade having a tip forming the blade gap between an inner surface of the shroud segment, the process comprising the steps of:

providing for the support ring to be made from a material having a coefficient of thermal expansion less than the material of the retainer and shroud assembly;

providing for a slot member in one of the support ring or the retainer/shroud assembly to allow for a radial movement of the retainer/shroud assembly with respect to the support ring; and, providing for the segment gap and the slot member to be of such lengths that the blade gap remains substantially the same during a take-off mode, a reduced power mode, and a steady state mode of operating the gas turbine engine.

2. The process of passively controlling a blade gap of claim 1, and further comprising the step of:

providing for the slot member as to be a slot in the retainer/shroud assembly.

3. The process of passively controlling a blade gap of claim 2, and further comprising the step of:

providing for a retainer member to secure the retainer/shroud assembly to the support ring.

4. The process of passively controlling a blade gap of claim 1, and further comprising the step of:

providing for a spring member located between the retainer/shroud assembly and the support ring to produce a bias force against the retainer/shroud assembly in a direction toward the blade gap.

5. The process of passively controlling a blade gap of claim 1, and further comprising the step of:

providing for a shroud segment and the retainer member to be separate members.

6. The process of passively controlling a blade gap of claim 1, and further comprising the step of:

providing for the support ring to be made substantially of Nilo K or Inco 909.

7. The passive control assembly of claim 1 above, and further comprising:

the radial movement means comprises a slot member in either of the support ring or the retainer member of the retainer/shroud segment.

8. The passive control assembly of claim 7 above, and further comprising:

the slot member is located in the retainer member of the retainer/shroud segment.

9. The passive control assembly of claim 8 above, and further comprising:

a bolt member securing the retainer member to the support ring through the slot member to allow for the radial movement of the retainer member with respect to the support ring.

10. The passive control assembly of claim 1 above, and further comprising:

a spring member positioned between the support ring and the retainer/shroud segment to provide a bias force against the retain/shroud segment in the direction toward the blade gap.

11. A passive control assembly of a blade gap in a gas turbine engine, the gas turbine engine comprising a support ring secured to an engine casing, a plurality of retainer/shroud segments secured to the support ring and forming a shroud segment gap between adjacent shroud segments, and a rotor blade having a blade tip forming the blade gap, the improvement comprising:

radial movement means to allow for radial movement of the retainer/shroud segment with respect to the support ring;

the support ring being made of a material having a lower coefficient of thermal expansion than that of the retainer/shroud segments; and, the segment gap being of such length that the blade gap remains substantially unchanged during operation of the gas turbine engine in the initial heat-up mode, reduce power mode, and steady state mode.

12. The passive control assembly of claim 11 above, and further comprising:

the segment gap being of such length that, upon initial heat-up, the segment gap is reduced until the adjacent shroud segment make contact, and upon further thermal expansion of the shroud segments, the shroud segments move in a radial direction away from the blade tip.

13. The passive control assembly of claim 11 above, and further comprising:

the support ring being formed substantially from either Nilo K or Inco 909.

14. A gas turbine engine, comprising:

a rotor blade;

a support ring, the support ring secured within a casing of the engine;

a plurality of shroud segment assemblies, each segment assembly secured to the support ring;

a slot member in one of the support ring or the shroud segment assembly, the slot member allowing for radial movement of the shroud segment with respect to the support ring;

the support ring being made of a material having a coefficient of thermal expansion less than that of the shroud segment assembly;

a blade gap formed between a tip of the rotor blade and an inner surface of the shroud segment assembly; and, a shroud segment gap formed between adjacent shroud segment assembly, the segment gap being of such length that the blade gap remains substantially constant during operation of the engine in a take-off mode, a reduce-power mode, and a steady-state mode.

15. The gas turbine engine of claim 14, and further comprising;

the support ring being formed substantially of either Nilo K or Inco 909.

16. The gas turbine engine of claim 14, and further comprising;

the shroud segment assembly comprising a shroud segment secured to a retainer member, the retainer member being secured to the support ring through the slot member.

17. The gas turbine engine of claim 16, and further comprising;
the slot member being formed in the retainer member; and,
a bolt member to secure the retainer member to the support ring and allow the retainer member and the segment shroud to move in the radial direction with respect to the support ring.

18. The gas turbine engine of claim 14, and further comprising;
a spring member positioned between the support ring and the shroud segment assembly, the spring member providing for a bias force to move the shroud segment assembly away from the support ring.

* * * * *